(12) United States Patent
Bobinger et al.

(10) Patent No.: US 10,800,484 B2
(45) Date of Patent: Oct. 13, 2020

(54) SCOOTER, CONTROL DEVICE AND CONTROLLING METHOD

(71) Applicant: Bayerische Motoren Werke Aktiengesellschaft, Munich (DE)

(72) Inventors: Robert Bobinger, Huegelshart (DE); Udo Ochner, Haimhausen (DE); Ernst Gruenwald, Munich (DE); Fabian Bachmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 15/680,965

(22) Filed: Aug. 18, 2017

(65) Prior Publication Data

US 2017/0341704 A1 Nov. 30, 2017

Related U.S. Application Data

(63) Continuation of application No. PCT/EP2016/053089, filed on Feb. 15, 2016.

(30) Foreign Application Priority Data

Mar. 2, 2015 (DE) .......................... 10 2015 203 641

(51) Int. Cl.
*B62M 6/50* (2010.01)
*B62K 3/00* (2006.01)
*B62M 6/60* (2010.01)

(52) U.S. Cl.
CPC ............... *B62M 6/50* (2013.01); *B62K 3/002* (2013.01); *B62M 6/60* (2013.01); *B62K 2202/00* (2013.01); *B62K 2204/00* (2013.01)

(58) Field of Classification Search
CPC ........... B62M 6/50; B62M 6/60; B62K 3/002; B62K 2202/00
(Continued)

(56) References Cited

U.S. PATENT DOCUMENTS 5,848,660 A 12/1998 McGreen
6,227,324 B1 * 5/2001 Sauve .................... B62D 61/02
180/181
(Continued)

FOREIGN PATENT DOCUMENTS

CA 2 344 026 A1 10/2002
CN 2487641 Y 4/2002
(Continued)

OTHER PUBLICATIONS

German Search Report issued in counterpart German Application No. 10 2015 203 641.3 dated Oct. 8, 2015 with partial English-language translation (ten (10) pages).
(Continued)

*Primary Examiner* — Jacob D Knutson
(74) *Attorney, Agent, or Firm* — Crowell & Moring LLP

(57) ABSTRACT

A control device for a scooter and a scooter for transporting individuals are provided. The scooter is operable using physical strength in a first mode of operation while being operable using physical strength and/or electric power in a second mode of operation. The scooter has an operating device for a control unit, and an electric motor which allows the scooter to be powered. A propulsive force is created on the scooter by actuating the operating device.

10 Claims, 2 Drawing Sheets

(58) Field of Classification Search
USPC .......................................................... 180/220
See application file for complete search history.

(56) References Cited

U.S. PATENT DOCUMENTS

| | | | | |
|---|---|---|---|---|
| 6,343,667 | B2* | 2/2002 | Sauve | B62D 61/02 |
| | | | | 180/181 |
| 6,874,591 | B2* | 4/2005 | Morrell | A63C 17/12 |
| | | | | 180/179 |
| 2002/0000339 | A1* | 1/2002 | Tsai | B62K 3/002 |
| | | | | 180/65.1 |
| 2003/0221888 | A1 | 12/2003 | McKinney, Jr. et al. | |
| 2015/0133253 | A1* | 5/2015 | Huang | B62M 6/65 |
| | | | | 475/149 |

FOREIGN PATENT DOCUMENTS

| | | |
|---|---|---|
| DE | 42 40 439 A1 | 6/1994 |
| DE | 100 53 043 A1 | 9/2001 |
| DE | 100 34 277 A1 | 1/2002 |
| DE | 20 2013 004 872 U1 | 8/2013 |
| EP | 2 777 783 A1 | 9/2014 |
| WO | WO 2012/163789 A1 | 12/2012 |
| WO | WO 2015/086274 A1 | 6/2015 |
| WO | WO 2015/091074 A1 | 6/2015 |

OTHER PUBLICATIONS

International Search Report (PCT/ISA/210) issued in PCT Application No. PCT/EP2016/053089 dated Apr. 26, 2016 with English-language translation (nine (9) pages).
German-language Written Opinion (PCT/ISA/237) issued in PCT Application No. PCT/EP2016/053089 dated Apr. 26, 2016 (ten (10) pages).
Chinese-language Office Action issued in counterpart Chinese Application No. 201680004208.8 dated Oct. 15, 2018 with English translation (13 pages).
German-language Office Action issued in counterpart European Application No. 16704232.4 dated May 7, 2019 (11 pages).
Chinese-language Office Action issued in counterpart Chinese Application No. 201680004208.8 dated May 10, 2019 with English translation (17 pages).

* cited by examiner

SCOOTER, CONTROL DEVICE AND CONTROLLING METHOD

CROSS REFERENCE TO RELATED APPLICATIONS

This application is a continuation of PCT International Application No. PCT/EP2016/053089, filed Feb. 15, 2016, which claims priority under 35 U.S.C. § 119 from German Patent Application No. 10 2015 203 641.3, filed Mar. 2, 2015, the entire disclosures of which are herein expressly incorporated by reference.

BACKGROUND AND SUMMARY OF THE INVENTION

The present invention relates to a scooter for transporting individuals, wherein the scooter can be driven by motor power in one operating mode. The present invention further relates to a control device and to a method for controlling a scooter.

Scooters which are currently available on the market include variants for children, which are operated as conventional scooters, and as precursors to a bicycle. In educational respects, scooters allow children to train their sense of balance, their leg muscles and to acquire a feeling for speed, steering and braking. Products of this kind are available in different sizes which are all driven exclusively by means of muscle power (physical strength). In recent years, scooters of this kind have also become popular amongst adults, wherein these scooters differ from scooters for children in respect of their size, in particular their wheel size. However, in addition to these vehicles, which can be driven purely by muscle power, scooters which can be operated with the aid of electrical energy by way of an electric motor are also available. A throttle twist grip, as is known from the motorcycle sector, or a lever can be used to vary and therefore adjust the electrical power, so that the electric scooter moves forward at a desired speed.

The object of the present invention is to provide an alternative scooter which can be driven by muscle power and also with the aid of electrical energy. A particular object of the present invention is to provide a scooter of which the operator control concept during operation with electrical motor power assistance simulates operation with pure muscle power as accurately as possible.

This and other objects are achieved by a scooter, a control device, and a method in accordance with embodiments of its invention.

The invention proposes a scooter for transporting individuals, wherein the scooter can be driven by motor power in at least one operating mode. The scooter comprises at least one operating device and at least one electric motor by way of which the scooter can be driven. A propulsive force is created on the scooter by the motor when the operating device is operated. Furthermore, the scooter can be operated with muscle power in a first operating mode and with motor power in a second operating mode. The scooter can also be driven by muscle power, in addition to the electrical power, in the second operating state. As a result, no electrical energy is used for alternative assistance in the first operating mode, and therefore the scooter can be operated as a conventional scooter. In the second operating mode, an operator of the scooter can select whether to use purely electromotive driving or, in addition to electric motor assistance, also to use muscle power for propulsion.

An individual propulsive force can be exerted on the scooter by individual operation of the operating device. As a result, a motorized operating state in which the scooter is operated by electrical auxiliary power can be realized in a particularly simple manner, wherein this motorized operating state simulates an operating state with muscle drive power in a manner as close to reality as possible. In the case of operation by muscle power, one leg of the scooter rider is always on a footboard. The scooter rider uses the other leg to occasionally push against the roadway and generate an individual propulsion force (pulse) on the scooter. This discrete generation of the propulsion force is electrically simulated by the present invention in which the drive of the scooter is driven by individual forward pulses in the electrical operating state.

According to a preferred embodiment, a propulsion force (pulse) is generated for a predetermined time period by operating the operating device. During this predetermined time period, the scooter covers a predetermined or maximum permissible distance. If the scooter moves forward at a first speed, a propulsion force is generated by operating the operating device for a time period. During this time period, the scooter accelerates from a first speed, which it was at before operation of the operating device, to a second speed which is higher than the first speed. The time period corresponds to the time interval which the scooter requires in order to cover a predetermined distance under the action of the propulsion force. This predetermined distance can be, in particular, 1 m, 2 m, 5 m, 8 m, 10 m, 12 m or 15 m long. In other words: the predetermined time period is dependent on the speed of the scooter. The propulsion force is switched off after the predetermined distance has been reached or the predetermined time period has elapsed. The scooter then briefly moves forward at the second speed on account of its mass inertia and is slowly braked on account of the frictional forces.

Furthermore, generation of a propulsion force can be suppressed below a minimum speed and/or above a maximum speed of the scooter when the operating device is operated. As a result, it is not possible to trigger propulsion pulses below a predetermined speed. This is a significant advantage since undesired acceleration when traveling slowly or when starting from a standstill, for example due to incorrect operation of the operating device, is prevented as a result. Furthermore, propulsion pulses are also suppressed when a maximum permissible maximum speed is reached. This provides an advantage from a safety aspect since a maximum speed of the scooter during electrical operation can be realized in a particularly simple manner. In order to achieve higher speeds, the rider then has to consciously accelerate further using muscle power by conventional pushing. Furthermore, this also provides advantages in respect of overloading of the electric motor and security against excessive discharging of the electric battery of the scooter. By way of example, 3 km/h or a walking speed of 6 km/h can be selected as the minimum speed. A possible maximum speed is a speed of 20 km/h, 25 km/h, 32 km/h or 20 mph.

Furthermore, the second operating mode of the scooter can be activated by double operation of the operating device above a minimum speed. In this way, it is possible to ensure that the scooter is initially accelerated by means of muscle power to or beyond the minimum speed. In order to then prevent undesired propulsion energy being released, additional activation of the second operating mode is provided. This activation can be formed, by way of example, by a double operation of the operating device. This double operation has to be performed within a brief time period of, for example, 1 s, 2 s, 3 s or 5 s. It goes without saying that the activation of the second operating mode can also be formed in some other way, for example by pressing an activation button.

The scooter can additionally have at least one control device or one regulating device. Furthermore, the scooter can be designed in such a way that a first signal is output to the control device by operation of the operating device and a second signal is output to the motor by the control device at least on the basis of the first signal, as a result of which the motor generates a propulsion force on the scooter.

The invention is not intended to be limited to the embodiment described above in which a signal is output by the operating device. In an alternative variant of the invention, the operating device is in the form of a switch which does not necessarily actively output a signal. In this variant, the control device detects the state of the switch (ON or OFF) and on the basis of this ascertains whether the operating device is operated or not. These two embodiments have an analogous function, and therefore output of a signal is also to be understood as detecting a state of the operating device.

In a further aspect, the invention relates to a control device for controlling a propulsion force of a scooter, wherein the scooter can be driven by electrical motor power in at least one operating mode. In this case, the control device is designed to carry out the steps of: detecting a signal from or a state of an operating device and outputting a signal to an electric motor, wherein a propulsion force is generated on the scooter by the signal from the electric motor. In this case, the scooter can be operated by muscle power in a first operating mode and by muscle power and/or electrically in a second operating mode. As already mentioned above with respect to the scooter, this provides the advantage that operation of the scooter with muscle power is simulated in a particularly simple manner during operation of the scooter in an operating state with electrical auxiliary assistance.

Furthermore, the control device can be designed to carry out at least the steps of: detecting a signal from a speed detection device, which signal represents the current speed of the scooter, comparing the value of the current speed of the scooter with a value of a minimum speed and/or the value of a maximum speed, and outputting a signal to the electric motor when the current speed is greater than or equal to the minimum speed and less than or equal to the maximum speed of the scooter. In this way, it is possible to ensure in a particularly simple manner that a propulsion force on the scooter is triggered only within a predetermined speed range.

Furthermore, the controller can be designed to carry out at least the following steps: detecting the operating state of the scooter, wherein, when the scooter is in a first operating state and operation of the operating device is detected, no signal is output to the electric motor by the control unit and, when the scooter is in a second operating state and operation of the operating device is detected, a signal is output to the electric motor, in order to generate a propulsion force. In this way, it is possible to ensure that a plausibility check is carried out, wherein a propulsion force is output only when the scooter is in a second operating state. This prevents undesired propulsion pulses being generated on the scooter due to incorrect operation.

In a further aspect, the invention relates to a method for controlling a propulsion force on a scooter, comprising the steps of: detecting operation of an operating device, and outputting a signal to a motor for generating the propulsion force on the scooter. Detection of operation can be ascertained on the basis of detection of a signal which the operating device outputs or on the basis of the state of the operating device.

Furthermore, the method can comprise the steps of: detecting a speed of the scooter, and comparing the detected speed with a minimum speed and a maximum permissible speed, wherein the signal is output to the motor only when the speed of the scooter is greater than or equal to the minimum speed and less than or equal to the maximum permissible speed.

Furthermore, the method can comprise the step of: detecting an operating state in which the scooter can be driven by motor power. In this way, it is initially determined whether the scooter is in the first or in the second operating state.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
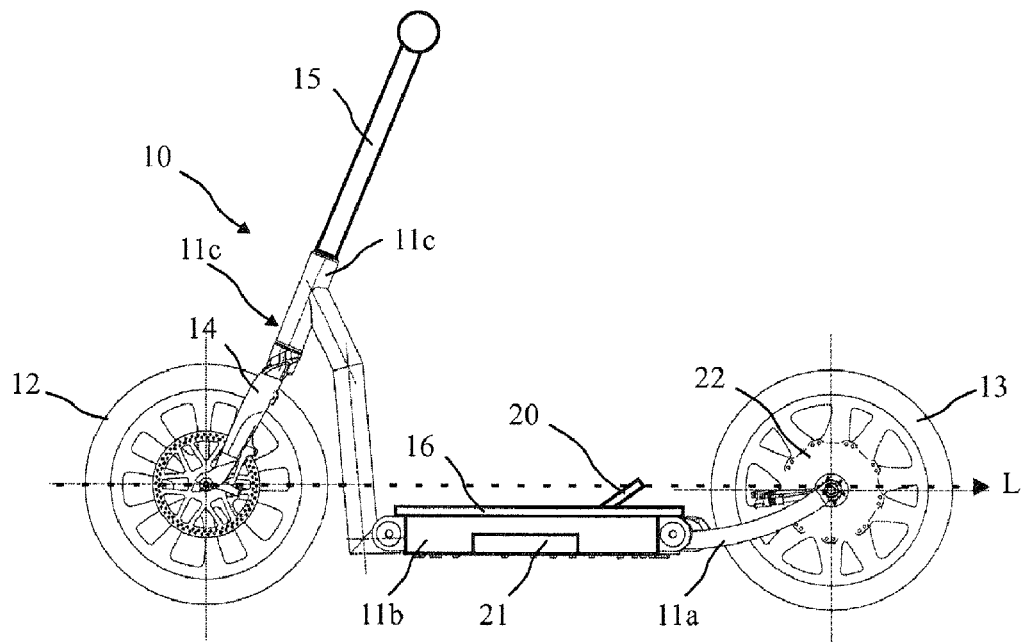
FIG. 1 is a side view of the basic, structural design of a scooter.

The overall design of the scooter 10 is intended to be explained with reference to FIG. 1. The scooter 10 has a frame 11, a front wheel 12, a rear wheel 13, a front wheel guide 14 and a steering unit 15. The front wheel guide 14 is designed as a fork and is rotatably mounted in a head tube 11c and is therefore arranged on the frame 11. The front wheel 12 can rotate about a steering axis with the aid of the steering unit 15, as a result of which it is possible for the scooter 10 to travel around a corner. The frame 11 of the scooter includes a middle part 11b and a rear wheel mount 11a. The head tube 11c, in which the fork 14 is rotatably mounted, is likewise a constituent part of the frame 11. The two wheels 12, 13 are arranged one behind the other in the longitudinal direction of the scooter L. However, the invention is not intended to be limited to single-track scooters since it can also be used in three-wheeled or four-wheeled vehicles. The control device according to the invention can also be used for bicycles with an auxiliary drive, so-called pedelecs or e-bikes. A footboard 16 on which the scooter rider stands is provided in the middle part 11b of the frame 11. An operating device 20 is provided on the top side of the footboard. In FIG. 1, the operating device is illustrated as a lever. In a departure from this illustration, the operating device 20 can also be in the form of a pushbutton. In further embodiments, the operating device 20 can also be arranged as a twist grip, lever or button on the handlebar of the steering unit 15. In the latter case, operation is then performed by hand.

In the embodiment of the scooter 10 illustrated in FIG. 1, the operating device 20 is operated by foot. The scooter rider advantageously stands on the ball of his foot and makes contact with the operating device 20 with his heel. This foot position allows extremely secure footing. In FIG. 1, a control device 21 is provided in the middle part 11b of the frame 11. The control device 21 interacts with the operating device 20 and an electric motor 22. Here, the electric motor 22 is, by way of example, illustrated as a hub motor which is integrated in the rear wheel 13 of the scooter 10. The rear wheel 13 is the wheel which is at the rear in the longitudinal direction L of the scooter 10. In this case, the longitudinal direction arrow L points counter to a movement direction of the scooter 10 when it is traveling forward.

Therefore, the scooter 10 can be moved forward by pushing using one's muscle power (physical strength) in a first operating mode. Furthermore, a motorized auxiliary power can be switched on by the electric motor in a second operating mode of the scooter 10. This motorized auxiliary power is sufficient to move the scooter forward via the motor.

Figure 2:
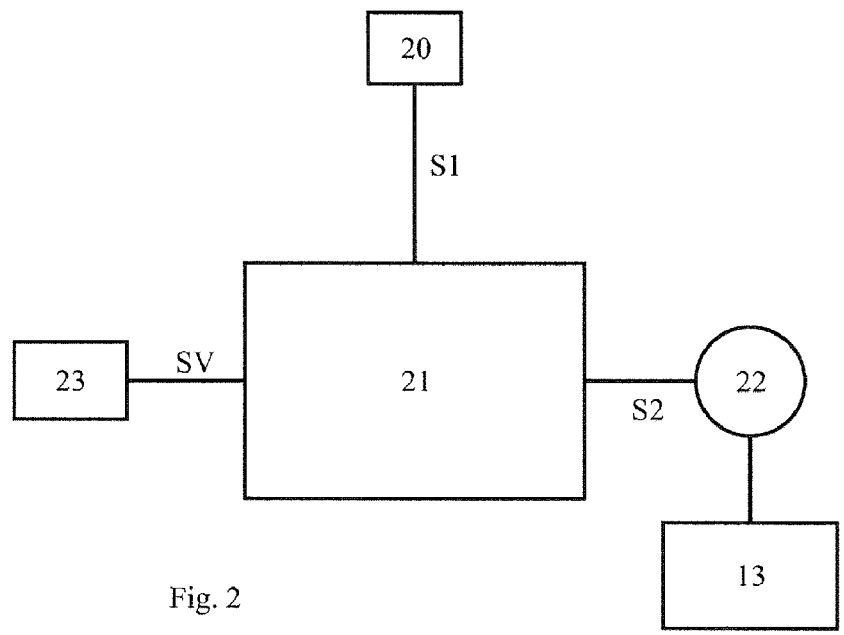
FIG. 2 is an excerpt of a basic circuit diagram with essential components of an electrically drivable scooter.

The manner of operation of the controller in the second operating mode is intended to be explained with reference to FIG. 2 and the text which follows. FIG. 2 shows only an excerpt of the components and element of the control system, wherein only those components and elements which are the most necessary for the explanation are illustrated. When it is operated, the operating device 20 generates a signal S1 which is detected by the control device 21. In other words: as long as the operating device 20 is pressed down, it outputs the signal S1 to the control device 21. Furthermore, the control device 21 also detects a speed signal SV which is output by a speed sensor 23, for example a speedometer. On the basis of the speed signal SV, the control device 21 can determine whether the speed of the scooter 10 is in a predetermined speed range. This speed range is limited at the lower end by a minimum speed $V_{min}$, and at the upper end by a maximum speed $V_{max}$. The absolute values, that is to say the boundary values $V_{min}$ and $V_{max}$, can lie within or outside the speed range in this case. When the control unit 21 then detects that the propulsion speed lies within this speed range (for example between 6 km/h and 25 km/h) and operation of the operating device 20 is detected owing to the signal S1, the control device 21 outputs a second signal S2 to the electric motor 22. Owing to this signal S2, the electric motor 22 is activated and generates a propulsion force on the scooter 10. As shown in FIG. 2, the electric motor 22 is mechanically connected to the rear wheel 13.

Figure 3:
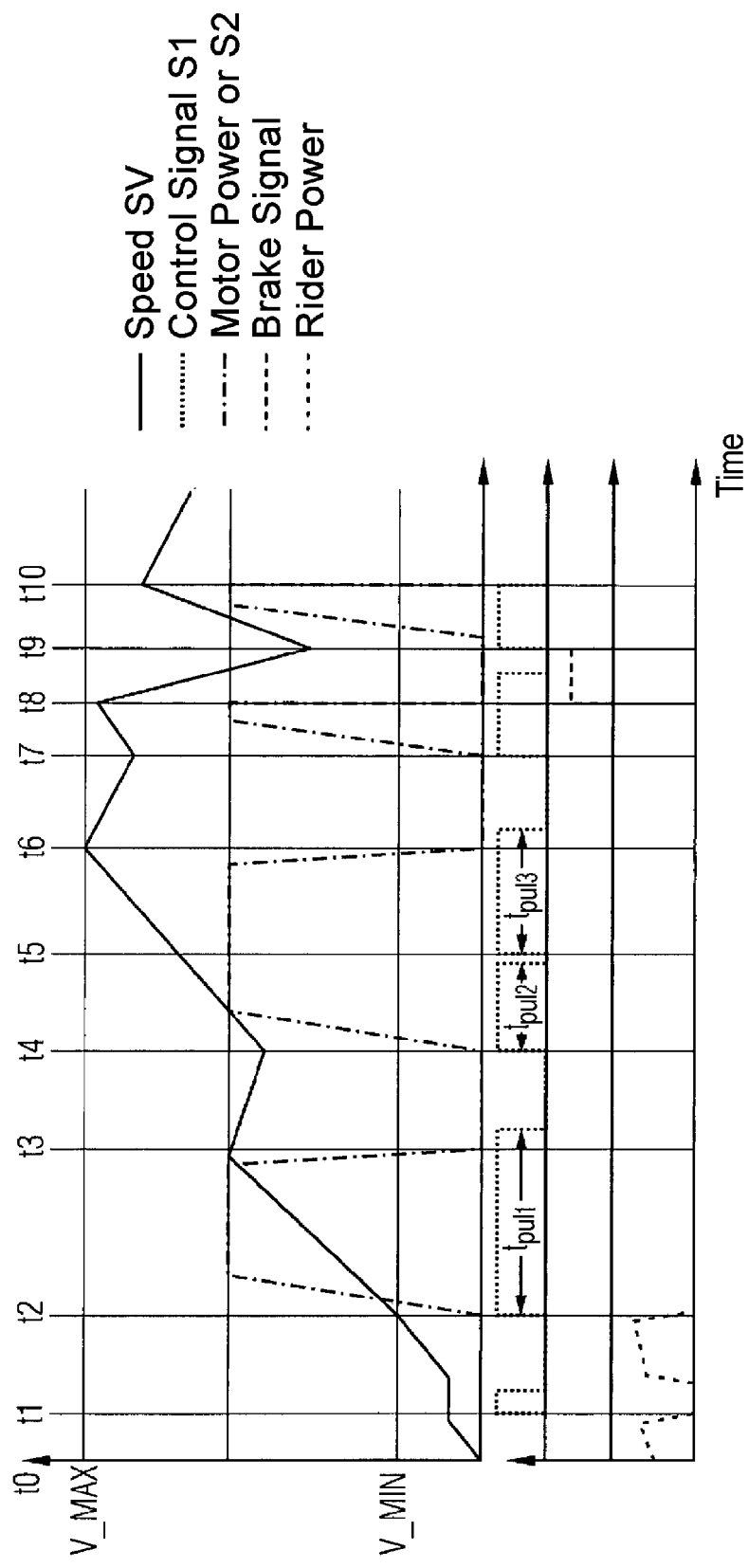
FIG. 3 is a riding state diagram in which various riding states of the scooter are graphically depicted.

Operator control or the operator control concept of the scooter 10 in the second operating mode is intended to be explained with reference to FIG. 3. FIG. 3 illustrates various riding states by way of example. The speed of the scooter 10 is below a minimum speed $V_{min}$ at time interval t0 to t2. As shown by the curve for rider power, the scooter 10 is propelled forward by pushing via foot between times t0 and t2.

At time t1, the operating device 20 is operated by the rider, as shown by the rising flank of signal S1 in FIG. 3 at time t1. However, the control device 21 suppresses actuation of the motor signal since no signal S2 is output to the motor 22 below the speed $V_{min}$. This is shown in FIG. 3 by no motor signal, which corresponds to the signal S2, being illustrated. The absence of the motorized propulsion force is noticed by the rider of the scooter 10. The rider releases the operating device 20 and pushes the scooter using muscle power. This is illustrated by the falling flank of signal S1 and graphically illustrated by the second increase in rider power. The scooter is further accelerated by further pushing by the rider immediately before time t2, and therefore the scooter exceeds the minimum speed at time t2. At the same time, the operating device 20 is pressed at time t2. The control device 21 then outputs a control signal S2 to the electric motor 22 since the speed of the scooter 10 is in a permissible speed range. As a result, the scooter 10 is accelerated over a distance of, for example, 5 m, at a preselected power level, see the maximum motor power $P_{Motor\ max}$ in FIG. 3 for example. A propulsion force is exerted on the scooter 10 over this distance, illustrated by the acceleration from time t2 until directly shortly before time t3. As already mentioned in the introductory part, the propulsion force is applied only for the period which is required in order to cover a predetermined distance of, for example, 5 m, and is then automatically, that is to say autonomously, switched off again (thus it is also referred to as a propulsion pulse). This is shown in FIG. 3 since the motor power drops again directly before time t3 and the speed of the scooter also drops somewhat later, owing to the inertia of the scooter, but still shortly before time t3. Since the time period for which the propulsion force is exerted on the scooter is dependent on the absolute speed of the scooter, the propulsion force acts on the scooter 10 for a relatively short time at high speeds and for a relatively long time at low speeds.

Between time t3 and t4, the scooter 10 rolls without propulsion force and is continuously braked by riding-dynamics frictional forces, that is to say rolling friction, relative wind, etc. As a result, the speed drops until time t4. At time t4, the operating device 20 is once again operated by the scooter rider. The control device 21 detects this and outputs a control signal S2, as a result of which the motor power is once again increased to the predetermined value $P_{Motor\ max}$ power level. The scooter experiences an additional propulsion pulse and further accelerates between time t4 and t5. At time t5, the operating device is once again pressed by the scooter rider. A further propulsion pulse is generated as a result. Since the maximum duration of the propulsion pulse generated at time t4 has not yet elapsed, the signal S2, which was generated at time t4, is suppressed and a new signal S2 is generated at time t5. This happens so quickly that the profile of the motor power does not correspond to the profile of the signal S2 at this point. The motor power is constant at this point. Owing to multiple operation of the operating device 20, propulsion pulses can be attached to one another and, as a result, the scooter can be accelerated to a desired target speed in a relatively short time. The absolute value of individual accelerations remains the same. Only phases in which the scooter 10 would slow down without a propulsion pulse are avoided. Each operation of the operating device 20 generates a new propulsion pulse which at maximum is sufficient in order to drive the scooter 10 for a predetermined distance $w_x$ of, for example, 10 m. If a new propulsion pulse is generated before the predetermined distance $w_x$ is reached, the remaining distance of the preceding pulse expires as it were. The dependence of the duration of a pulse on the actual speed of the scooter is shown in FIG. 3 with comparison of the duration $t_{pul1}$ of the pulse at time t2 with the duration of the pulse $t_{pul3}$ at time t5 compares. The subsequent propulsion pulse at time t5 is significantly shorter than the propulsion pulse at time t2 since the speed of the scooter is higher at time t5. In this case, the duration $t_{pul2}$ does not correspond to a complete predetermined distance $w_x$. The scooter rider 10 stops operation of the operating device 20 shortly before time t5, as shown by the falling flank of signal S1. This leads to a cancellation of signal S2 to the electric motor 22. Operation of the operating device 20 at time t5 once again starts the signal S2 in order to be output for the period which is necessary in order to cover the predetermined distance.

No propulsion force is applied to the scooter 10 from time t6 until time t7. The speed decreases between these two times. Analogously to the propulsion pulses described above, a new pulse is also generated at time t7, said new pulse leading to renewed acceleration of the scooter until time t8. A brake signal is generated by the scooter rider at time t8. In this case, braking can be performed mechanically or by electrical recuperation with the aid of the electric motor. Although the operating device is still pressed—as shown by the profile of signal S1—this leads to the propulsion pulse being immediately switched off or the signal S2 being suppressed, as shown by the drop in motor power. The speed drops from time t8 until time t9. At time t9, the brake is released, that is to say the brake signal is switched off and a new propulsion pulse is generated at the same time.

At time t10, the scooter rider stops operation of the operating device. Starting from time t10, the rider of the scooter 10 continues to roll without motor assistance. That is to say, at time t10, the driver relieves the operating device of loading, and therefore the control signal S1 is also stopped. As a result, the motor power is switched off and the drive pulse is canceled.

In order to accelerate the scooter 10, the driver has to press the pedal and keep it pressed. In this way, the rider generates motor assistance for acceleration over a maximum assistance distance which corresponds to the predetermined distance $w_x$. After the maximum assistance distance $w_x$ is reached, the motor assistance is automatically switched off, irrespective of whether the pedal is still pressed or not. In order to accelerate further, the driver has to briefly release the pedal, press it once again and keep it pressed. Motor assistance is once again generated for acceleration over a further maximum assistance distance $w_x$. This operator control logic corresponds to a first embodiment.

In a further embodiment of the invention, acceleration of the scooter 10 can be generated by an alternative operator control logic. In this case too, the rider has to press the pedal 20 in order to accelerate the scooter 10. However, it is not necessary to keep the operating device 20 pressed. Even if the operating device 20 is released, motor assistance for acceleration over a maximum assistance distance is maintained. The maximum assistance distance corresponds to the predetermined distance $w_x$ in this case too. After the maximum assistance distance $w_x$ is reached, the motor assistance is automatically switched off. In order to accelerate further, the rider has to press the pedal once again. The motor assistance is once again generated for acceleration over a further maximum assistance distance $w_x$. According to this second variant, the operating device functions like a switch which can be moved from an "ON" to an "OFF" position and vice versa. As soon as an "ON" position of the operating device 20 is detected, a propulsion pulse is generated. This propulsion pulse continues, even if the operating device 20 is moved to an "OFF" position before the maximum assistance distance is reached. In contrast to this, in a first variant, the propulsion pulse is immediately suppressed when an "OFF" position of the operating device is detected. If, in the second variant, the operating device 20 is once again moved to an "ON" position before the maximum assistance distance is reached, a new propulsion pulse is generated. This new propulsion pulse is applied for the period which is necessary in order to reach a maximum assistance distance. In other words, the assistance distance is reset when a subsequent, second propulsion pulse is generated before the maximum assistance distance of a first propulsion pulse is reached.

In both variants of the operator control logic, firstly the situation of the assistance distance $w_x$ being reached after the last pedal actuation or the situation of a maximum vehicle speed $V_{max}$ being reached serve as cancellation criteria for motor assistance during acceleration. The situation of the pedal being released by the driver is a criterion for canceling the propulsion only in the first variant of the operator control logic. It goes without saying that detection of a braking intervention which is generated by the driver is likewise a criterion for interrupting acceleration. The run-on time of the electric motor after detection of a reason for interruption is at most 0.8 s.

Since the operator control logic functions in a pulse-based manner, that is to say individual propulsion force pluses are generated on the scooter 10, constant travel is possible only in specific limits. If the rider desires constant travel, that is to say to travel at a constant speed between the minimum speed $V_{min}$ and the maximum speed $V_{max}$, the driver has to toggle around the value of the constant speed. The scooter 10 is correspondingly accelerated by brief pedal operations, wherein the speed correspondingly drops again owing to the traveling resistances after the pedal is released. Said scooter then has to accelerate once again. Therefore, the desired riding speed can be virtually constantly adjusted by the rider. However, absolutely constant travel when a scooter 10 is in muscle-powered mode is likewise possible only in specific limits, and therefore sufficiently accurate simulation is generated here too.

The option of a mechanical brake is provided for braking the scooter 10. When the brake is operated, a signal is passed to the control device 21 and any motor assistance which may be present is immediately interrupted. Therefore, this function also constitutes an emergency stop function for the scooter 10. As an alternative, electric braking can also be realized by the electric motor 22 functioning as a generator and recuperating the kinetic energy of the scooter 10. The recovered energy is then stored as electrical energy.

According to the invention, constant travel at walking speed can be achieved with the scooter 10. To this end, there are two options for achieving this riding state. In the second riding state, that is to say with electromotive assistance, the scooter is moved at a speed which is greater than the minimum speed $V_{min}$. A propulsion force which accelerates the scooter is generated by operating the operating device 20 and keeping it permanently pressed. The electric motor 22 is switched off after the maximum assistance distance $w_x$ is reached and exceeded. As long as there is no new pedal pulse, the scooter 10 is correspondingly decelerated on account of the traveling resistances. If, in this case, the speed of the scooter 10 drops below walking speed when the operating device is pressed, the control device 21 detects this and outputs a signal S2, as a result of which the motor is briefly switched on. As a result, a brief propulsion pulse is generated in order to accelerate the scooter to walking speed, for example 6 km/h. After walking speed is reached, the assistance power of the motor is switched off again. When walking speed is once again undershot, the motor assistance is further switched on, etc. by the control device 21. By way of this pulse-control of the signal S2, the vehicle speed toggles around the walking speed by approximately 0.5 km/h. If the driver releases the operating device 20, the speed drops again until the scooter 10 comes to a standstill.

As an alternative, constant travel at walking speed can also be achieved from a standstill. During starting, the scooter is stationary and therefore in the first riding mode, that is to say it can be driven forward only by means of muscle power. By pushing, the scooter is accelerated above the minimum speed $V_{min}$ and above the walking speed. The pedal is pressed twice quickly in succession in order to activate the second riding mode. After the second press, the pedal is kept in the pressed position. However, no propulsion pulse is generated by the electric motor 22 as a result and therefore the scooter 10 is not electromotively accelerated.

On account of the traveling resistances, the forward movement of the scooter 10 slows down until the speed drops below walking speed. The situation of walking speed being undershot is detected by the control unit 21. The control unit then outputs a signal S2 to the electric motor 22 which exerts a propulsion pulse on the scooter 10. As a result, the speed of the scooter toggles about the walking speed by approximately 0.5 km/h. In one embodiment of the invention, the walking speed and the minimum speed $V_{min}$ can be the same.

When the second operating mode is not activated, the scooter 10 can also be operated in a conventional manner purely by muscle power. As a result and when constantly traveling at walking speed, the scooter 10 can also be used in pedestrian zones. Owing to the use of the electrical auxiliary motor, the radius of action and therefore the range of use can be significantly extended, primarily in urban areas. The scooter provides significant advantages over bicycles, pedelecs or e-bikes since servicing of a chain or shifting system is not necessary. Similarly, there is also no risk of clothing being soiled by a shifting system or chain since these are not present. The control device 21 described above can also perform regulation functions and therefore function as a regulating device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A scooter for transporting individuals, wherein the scooter is drivable by motor power in at least one operating mode, comprising:
    an operating device;
    a controller;
    a speed sensor; and
    an electric motor by way of which the scooter is drivable, wherein
        the controller is configured to
            receive one or more operating signals from operation of the operating device by a user,
            receive one or more speed signals from the speed sensor, and
            issue one or more control signals to the electric motor,
        the one or more control signals to the electric motor are based at least in part on the one or more speed signals and the one or more operating signals, and
        the one or more control signals control the electric motor to generate at least one propulsion pulse having one or both of a predetermined time period and a predetermined travel distance, and terminate the propulsion pulse after reaching the predetermined time period or the predetermined travel distance, independent of the user's operation of the operating device.

2. The scooter as claimed in claim 1, wherein the controller is configured to not generate the propulsion pulse below a minimum speed or above a maximum speed of the scooter when the operating device is operated.

3. The scooter as claimed in claim 1, wherein the at least one operating mode includes an operating mode in which the scooter is driven by motor power above a minimum speed of the scooter by double activation of the operating device.

4. The scooter as claimed in claim 1, wherein the discretely generated propulsion pulses correspond to a propulsion force to move the scooter forward.

5. A control device for controlling a propulsion pulse of a scooter drivable by an electrical motor in at least one operating state, comprising:
    a configured to
    receive one or more operating signals from an operating device,
    issue one or more control signals to the electric motor based at least in part on the one or more operating signals, the one or more control signals being configured to control the electric motor to generate at least one propulsion pulse having one or both of a predetermined time period and a predetermined travel distance, and
    terminate the at least one propulsion pulse after reaching the predetermined time period or the predetermined travel distance, independent of the one or more operating signals.

6. The control device as claimed in claim 5, wherein the controller is further configured to:
    detect a signal from a speed detection device, which signal represents a current speed of the scooter;
    compare a value of the current speed of the scooter with a value of a minimum speed or a value of a maximum speed; and
    issue the one or more signals to the electric motor only when the current speed is greater than or equal to the minimum speed and less than or equal to the maximum speed of the scooter.

7. The control device as claimed in claim 5, wherein the controller is further configured to:
    detect an operating state of the scooter, and
        (i) when the scooter is in a first operating state in which the scooter is operated by muscle power, the controller issues no signal to the electric motor when the one or more operating signals are received from the operating device, and
        (ii) when the scooter is in a second operating state in which the scooter is driven by motor power, the controller issues the one or more signals to the electric motor when the one or more operating signals are received from the operating device.

8. A method for controlling a propulsion pulse on a scooter, the method comprising the acts of:
    receiving at a controller one or more operating signals generated by operation of an operating device; and
    issuing from the controller one or more control signals to an electric motor configured to propel the scooter, wherein
        the one or more control signals to the electric motor are based at least in part on the one or more operating signals, and
        the one or more control signals control the electric motor to generate at least one propulsion pulse having one or both of a predetermined time period and a predetermined travel distance, and terminate the propulsion pulse after reaching the predetermined time period or the predetermined travel distance, independent of the operation of the operating device.

9. The method as claimed in claim 8, further comprising the acts of:
    detecting a speed of the scooter; and
    comparing the detected speed with a minimum speed and a maximum permissible speed, wherein the one or more signals is issued to the motor only when the speed of the scooter is greater than or equal to the minimum speed and less than or equal to the maximum permissible speed.

10. The method as claimed in claim 8, further comprising the act of:

detecting an operating state in which the scooter is driven by motor power.

* * * * *